United States Patent
Celik et al.

(10) Patent No.: US 9,253,485 B2
(45) Date of Patent: *Feb. 2, 2016

(54) VIDEO WATERMARKING

(71) Applicant: CIVOLUTION B.V., Eindhoven (NL)

(72) Inventors: Mehmet U. Celik, Eindoven (NL);
Johan C. Talstra, Eindhoven (NL);
Aweke N. Lemma, Eindhove (NL)

(73) Assignee: CIVOLUTION B.V., Eindhoven (NL)

( * ) Notice: Subject to any disclaimer, the term of this patent is extended or adjusted under 35 U.S.C. 154(b) by 128 days.

This patent is subject to a terminal disclaimer.

(21) Appl. No.: 13/916,083

(22) Filed: Jun. 12, 2013

(65) Prior Publication Data

US 2013/0279741 A1    Oct. 24, 2013

Related U.S. Application Data

(63) Continuation of application No. 12/522,873, filed as application No. PCT/IB2008/050095 on Jan. 11, 2008, now Pat. No. 8,467,445.

(30) Foreign Application Priority Data

Jan. 12, 2007 (EP) .................... 07100497

(51) Int. Cl.
  G06K 9/00 (2006.01)
  H04N 19/467 (2014.01)
  G06T 1/00 (2006.01)

(52) U.S. Cl.
  CPC ...... *H04N 19/00557* (2013.01); *G06K 9/00744* (2013.01); *G06T 1/0028* (2013.01); *G06T 1/0085* (2013.01); *H04N 19/467* (2013.01); *G06T 2201/0052* (2013.01)

(58) Field of Classification Search
  CPC .......... H04N 19/00557; H04N 19/467; G06K 9/00744; G06T 1/0085; G06T 1/0028; G06T 2201/0052
  USPC ....................................... 382/100
  See application file for complete search history.

(56) References Cited

U.S. PATENT DOCUMENTS 6,359,998 B1* 3/2002 Cooklev ................ 382/100
2001/0053237 A1* 12/2001 Hashimoto ............ 382/100

(Continued)

FOREIGN PATENT DOCUMENTS

EP  1102474 A2  5/2001
EP  1395036 A1  3/2004
WO  9929114 A1  6/1999

OTHER PUBLICATIONS

Search Report for International Patent Application No. PCT/IB2008/050095; Jul. 16, 2008.

*Primary Examiner* — Kwang B Yao
*Assistant Examiner* — Syed Bokhari
(74) *Attorney, Agent, or Firm* — Barnes & Thornburg LLP

(57) ABSTRACT

A method of watermarking a video signal includes encoding the video signal using at least one encoding parameter that is time-varied according to a watermarking pattern. The parameter affects information lost while encoding the signal. The parameter may be a quantization factor corresponding to a particular coefficient of an encoding transform. The parameter may be an element of a quantization matrix corresponding to a particular coefficient in a block DCT transform. The method may be implemented in devices with limited processing resources by means of a software update. The method enables the devices to imprint an encoded signal with a robust watermark, which may survive subsequent decompression and recompression. Alternatively, a video signal may be watermarked by modifying a magnitude of a non-dc spatial frequency component in a manner which varies with time according to a watermarking pattern. Corresponding watermark detection methods and watermarking devices also are disclosed.

12 Claims, 4 Drawing Sheets

(56) References Cited

U.S. PATENT DOCUMENTS

| | | |
|---|---|---|
| 2002/0118392 A1 | 8/2002 | Miyake |
| 2003/0133590 A1* | 7/2003 | Miller et al. ............... 382/100 |
| 2003/0161550 A1 | 8/2003 | Cheng et al. |
| 2005/0063018 A1 | 3/2005 | Miyake |
| 2005/0069169 A1* | 3/2005 | Zarrabizadeh ............... 382/100 |
| 2007/0154064 A1 | 7/2007 | Rhoads et al. |
| 2008/0273741 A1 | 11/2008 | Fujii et al. |
| 2010/0128921 A1* | 5/2010 | Alattar et al. ............... 382/100 |

\* cited by examiner

Laplacian distribution of unit variance (one side shown)

VIDEO WATERMARKING

CROSS REFERENCE TO RELATED APPLICATIONS

The present application is a continuation of U.S. patent application Ser. No. 12/522,873, filed 24 Sep. 2009, entitled VIDEO WATERMARKING, which claims the benefit of priority to International Patent Application No. PCT/IB2008/050095 filed 11 Jan. 2008, which further claims priority to European Patent Application No. 07100497.2 filed 12 Jan. 2007, the contents of which are incorporated herein by reference in their entirety.

FIELD OF THE INVENTION

The present invention relates to the watermarking of video signals and to the detection of watermarks in video signals. In particular, although not exclusively, the invention relates to the watermarking of video signals as they are encoded in MPEG format.

BACKGROUND OF THE INVENTION

Watermarking of video signals (that is, the embedding of some identifiable code, pattern or feature within the video signal) is known, and can be used to identify the source of a video signal or the signal's processing history, for example. It is also known to watermark a video signal as part of an encoding process, that is, to embed a watermark in the encoded signal, whether or not the source signal was already watermarked. Watermarking can also be regarded as imprinting a signal with an identifiable watermarking pattern. Throughout the remainder of this specification the term watermarking pattern will be used to encompass any such identifiable pattern, code or feature suitable for watermarking purposes.

Forensic tracking watermarks can form the basis for highly flexible and transparent copyright protection systems. For example, according to the watermark embedded in a signal, certain actions with that signal may be permitted (such as the recording of a watermarked movie on the storage device of a personal video recorder (PVR) or export of the movie to a user's portable player), whilst others denied (such as subsequent distribution of a received movie over a peer-to-peer network).

In general, video watermarking can be performed on baseband (uncompressed) or compressed video streams. Although the operations involved in baseband watermarking are generally simpler, the high data rates mean that the process either requires dedicated hardware or fast general-purpose processors. In contrast, the data rates for compressed domain watermarking are lower, but the complexity of parsing the bit-stream results in dedicated hardware or fast processors again being required. Thus, in either case, dedicated hardware or significant processor resources have in the past been necessary for video watermarking. Such dedicated hardware and/or the requisite processor resources have previously not been incorporated in consumer devices such as digital video recorders (DVRs), which are also known as personal video recorders (PVRs). These are devices that can record video without videotape to a digital storage device (typically a hard-drive-based storage medium), and include set-top boxes and software for personal computers. In other words, they permit capture and playback of video signals. Typically, current DVRs comprise limited processing resources and a dedicated encoder (such as a single encoder chip). Clearly, it would be problematic, if not impossible, to upgrade existing DVRs to increase their processing capabilities and to include additional hardware to enable them to watermark video signals.

A problem with certain known watermarking techniques is that it is possible to remove the watermark, for example by decompressing a watermarked encoded signal, and then re-compressing.

SUMMARY OF THE INVENTION

It is an object of certain embodiments of the invention to provide a watermarking method that overcomes, at least partially, one or more of the problems identified above in relation to the prior art. Certain embodiments aim to provide a video watermarking method which can be implemented in existing DVRs, without requiring hardware modification.

According to a first aspect of the invention there is provided a method of watermarking a video signal, the method comprising:

encoding the video signal using a plurality of encoding parameters; and during said encoding, varying a value of at least a selected one of said parameters with time according to a watermarking pattern, the selected parameter being a parameter that affects at least a type or an amount of information lost in encoding the signal.

An example of a parameter affecting an amount of information lost in the encoding process is a quantization factor. The term "quantization factor" in this description should be interpreted as including a quantization step size and a scaling factor that can modify a quantization step size. As an example of affecting a type of information lost, one may vary one or more parameters to eliminate more horizontal frequencies than vertical frequencies. The total amount of information in the encoded signal could be the same as if the watermark had not been embedded, but the change would be significant and detectable.

Advantageously, this method can be implemented with modest processing resources, and yet, as the time-varying selected parameter is one that affects a lossiness of the encoding process, a robust watermark is embedded. Information lost in the encoding process cannot later be recovered exactly by decoding, and hence the watermark may remain detectable for at least a number of subsequent decoding and re-encoding operations. The watermark may be detected by suitable statistical analysis of the encoded signal, or a decoded signal derived from it. This detection may be achieved by looking for a statistical correlation between a known watermark pattern and the variation in time of a parameter (or in other words, a property) of the signal that would be affected by varying the loss-affecting parameter during the encoding process. It will be appreciated that in the case of video signals comprising a sequence of frames, varying the selected parameter with time means that different values of the parameter are used in the encoding of different portions of the signal (those portions may comprise complete frames and/or portions of frames and/or groups of frames). Thus, a sequence of different parameter values may be used in the encoding of a video sequence. The varying of the value of the selected parameter(s) may also be regarded as modulating the parameter value(s) according to the watermarking pattern.

In certain embodiments the selected parameter is the bit-rate used to encode the video signal. This is a convenient way of controlling the amount of loss. Another suitable parameter is a quantization factor used to encode the video signal. The quantization factor may correspond to a particular coefficient of a transform used to encode the video signal. The transform may be a DCT (Discrete Cosine Transform), for example, or some other type. Thus, in certain embodiments the quantization factor is an element of a quantization matrix corresponding to a particular coefficient in a block DCT transform. The quantization factor may correspond to a particular sub-band in a wavelet transform. This happens, for instance, when video frames are encoded with JPEG2000, which uses wavelet transform. Then sub-bands correspond to low-high horizontal-vertical frequencies.

Thus, in certain embodiments the selected parameter is a quantization factor of a quantization matrix used to encode the video signal (e.g. a quantization matrix used to quantize the coefficients of a DCT matrix of a pixel luminance block in MPEG encoding). Advantageously, this technique may be implemented in existing DVRs without hardware modification as it requires only a small software modification. In a DVR, video and audio is typically compressed by a dedicated hardware encoder chip. The encoding parameters are usually set by a (small) software programmable microcontroller chip also managing the user interface etc. The quantization factor affects information loss because use of a higher value results in more coefficients being rounded to zero. Once rounded to zero, the relevant component cannot be recovered by decoding, even if one knows the quantization factor value that was used. Similarly, if a lower value is used, this results in certain components being represented in the encoded signal that would have otherwise disappeared.

Rather than modulating just one parameter, in certain methods embodying the invention the step of varying comprises varying the value of each of a plurality of selected said parameters with time according to the watermarking pattern, each selected parameter being a parameter that affects at least a type or an amount of information lost in encoding the signal. Advantageously, this can be used to imprint a video signal with an even more robust watermark and/or can provide the advantage that smaller variations in the values of the two or more parameters can be used to produce a detectable watermark than would be required if just a single parameter value was varied. Each selected parameter may, for example, affect a different type or amount of information lost in encoding the signal, or the same.

In certain embodiments, the plurality of selected parameters comprises two quantization factors of a quantization matrix used to encode the video signal. Again, such a technique is relatively easy to implement in existing DVRs as it requires only software modification. No additional processing is required during the encoding process; if a single encoder chip is used it need only perform exactly the same number of processing operations as before, just using modified quantization factors for some of those operations. In certain embodiments the two quantization factors comprise a first factor corresponding to a vertical frequency component of a DCT matrix and a second factor corresponding to a horizontal frequency component of a DCT matrix.

In certain embodiments the step of varying comprises increasing the value of one of said two quantization factors at the same time as reducing the value of the other one of said two quantization factors. Advantageously, this enables a detectable watermark to be embedded using parameter value perturbations that are well below the thresholds for producing noticeable artifacts in the decoded video signal. Watermark detection may conveniently be achieved by monitoring variations in the difference between signal energies in the two frequency bands corresponding to the two factors.

In certain embodiments the step of varying comprises switching between a plurality of different sets of parameter values. For example, in MPEG4-Part 10 (a.k.a. MPEG4-AVC or H.264), there are different parameter sets (group of parameter values) that may be used. For instance, a high motion scene may be better suited to one parameter set, while a static scene is better suited to another. In controlling an encoder one need send each set only once, and afterwards one may just refer to the set number. Varying one or more encoding parameters by changing among a finite number of parameter sets may therefore be efficient, in terms of processing requirements.

In certain embodiments, the watermarking pattern is a binary pattern comprising a sequence of ones and zeros, and the step of varying comprises using a quantization matrix in which said two quantization factors are set to respective first values to embed a one in the encoded video signal, and using a quantization matrix in which said two quantization factors are set to respective second values to embed a zero in the encoded video signal. In certain examples, the first value of one of said quantization factors is higher than the second value of that quantization factor, and the first value of the other of said quantization factors is lower than the second value of that quantization factor. It will be appreciated, however, that in alternative embodiments, just one parameter, or more than two parameters may be used to embed the watermark bits.

The step of varying may, in certain embodiments, comprise using a sequence of quantization matrices to encode the video signal, a value of at least one quantization factor of the matrices being arranged to vary along the sequence in accordance with the watermarking pattern.

In the methods discussed above, the watermarking pattern may advantageously be pseudo-random, making it harder to detect by unauthorized parties and helping to avoid it having any noticeable effect on the decoded video signal when displayed. The pattern may, for example, be derived pseudo-randomly from a key.

The watermarking pattern in certain embodiments is a binary pattern (in other words, it is a binary number or code imprinted on the signal).

In certain embodiments the watermarking pattern encodes payload information. Payload information may include various bits of information, e.g. a time stamp, device ID, user ID, location, etc. For instance, if you encode the device ID then encoded video will tell you on which device it has been recorded.

Another aspect of the invention is the use of any one of the above methods to watermark a video signal in a digital video recorder (DVR) comprising an encoder and a digital storage means. The step of encoding then comprises using the encoder to encode the video signal, and the step of varying comprises controlling the encoder to vary a value of said at least one selected parameter with time according to the watermarking pattern. Thus, the video signal may advantageously be watermarked by the DVR (useful for forensic tracking and copyright control purposes) without placing any additional processing demand on the encoder above that for normal encoding (that is without watermarking at the same time). The method may further comprise the steps of receiving the watermarking pattern at the DVR and using the received pattern to control the encoder. Thus, the watermark may be supplied (transmitted, broadcast) to the DVR from an external source, and the simple control processor controlling the encoder may be programmed with the watermark "on the fly", i.e. updated whilst in use (operation). Alternatively, the DVR control processor may be programmed with the watermark on start-up, or may generate the watermark locally.

Another aspect of the invention provides a method of watermarking a video signal in a device comprising an encoder (such as a digital video recorder (DVR), also known as a personal video recorder PVR, comprising an encoder and a digital storage means, such as a hard-drive-based digital storage medium), the method comprising:

using said encoder to encode the video signal using a plurality of encoding parameters; and controlling the encoder during said encoding of the video signal so as to vary a value of at least one of said encoding parameters with time according to a watermarking pattern.

Again, as the watermark is embedded by means of simple variation with time of an encoding parameter (that variation being characteristic of the watermark pattern), no additional processing demand is made on the encoder and hence the method can be implemented in existing devices such as DVRs, with programmable control processors, by software update alone.

Another example of a device in which the watermarking technique may be employed is a media-hub which MPEG compresses analog video, and then distributes it via WLAN throughout the home.

The method may further comprise the step of receiving the watermark pattern, such as from a source external to the device or apparatus in which the encoding is being performed. The selected parameter or parameters are then varied according to the received pattern.

Another aspect of the invention provides a method of watermarking a video signal, the method comprising:

encoding the video signal using a quantization matrix comprising a plurality of quantization factors; and during said encoding, varying a value of at least one of said quantization factors with time in accordance with a watermarking pattern. Advantages of this aspect will be apparent from the preceding discussion.

Yet another aspect of the invention provides a method of watermarking a video signal, the method comprising:

determining a sequence of quantization matrices according to a watermark pattern; and encoding the video signal using said sequence of quantization matrices, whereby the quantization matrix used to encode the video signal varies with time.

Another aspect provides a device (e.g. a digital video recorder (DVR)) comprising:

an encoder arranged to encode a video signal using a plurality of encoding parameters;

a digital storage means adapted to store encoded video signals; and control means arranged to control the encoder, the control means being further arranged to vary a value of at least one said encoding parameters with time, while the encoder is encoding a video signal, according to a watermark pattern.

The plurality of encoding parameters may comprise a plurality of quantization factors of a quantization matrix, and the control means may be arranged to vary a value of at least one of said quantization factors with time, while the encoder is encoding a video signal, according to the watermark pattern, whereby a sequence of different quantization matrices are used to encode the video signal. Rather than varying just a single parameter value, the control means in certain embodiments is arranged to vary a value of each of a plurality of said quantization factors with time, while the encoder is encoding a video signal, according to the watermark pattern.

In certain embodiments, the control means is adapted to receive the watermark pattern from a source external to the device. In alternatives, the control means is adapted to generate the watermark pattern. Again, the watermark pattern may be pseudo-random and/or binary.

Another aspect of the invention provides a method of detecting a watermark in a video signal, the watermark having been embedded using a method in accordance with claim 1, the detection method comprising:

monitoring a property of the video signal that varies with time;

identifying a pattern of variation in said property with time that is consistent with a watermark pattern.

Thus, the property being monitored is a property that is affected by variation of an encoding parameter that affects at least one of a type or an amount of information lost in an encoding process.

The identifying step may further comprise correlating a variation of said property with time with a watermark pattern.

The property may be a statistic of at least one transform coefficient corresponding to a block of pixels over a predetermined interval. For example, in certain embodiments said property is a sum of values over a predetermined interval of a coefficient of a DCT matrix corresponding to a block of pixels. In other words, the property may be indicative of a cumulative energy (over the predetermined interval) of the signal corresponding to a particular frequency component in the DCT matrix. The predetermined interval is related to the watermark pattern. For example, if one knows that each bit of a binary watermark pattern would have been embedded over an entire Group of Pictures (GOP) then the predetermined interval to use is a GOP.

In alternative embodiments, said property is a difference between a sum of values over a predetermined interval of a first coefficient of a DCT matrix corresponding to a block of pixels and a sum of values over said predetermined interval of a second coefficient of the DCT matrix. Thus, rather than monitoring variations in energy of a particular frequency component, one is now looking for variations in the difference between accumulated energies of two frequency components. Of course, in alternative embodiments, the monitored property may be derived from even more parameters or frequency components, but in general this requires more processing resources for detection.

In certain embodiments the video signal is a baseband signal comprising frames of pixel data, and the detection method further comprises encoding the video signal to a level comprising DCT blocks, each DCT block corresponding to a block of pixels.

In alternative embodiments the video signal is in an encoded (compressed) format, and the detection method further comprises decoding the video signal to a level comprising DCT blocks, each DCT block corresponding to a block of pixels.

Another aspect of the invention provides detection apparatus for detecting a watermark in a video signal, the watermark having been embedded using a method in accordance with claim 1, the detection apparatus comprising:

monitoring means arranged to monitor a property of the video signal that varies with time; and pattern identification means arranged to identify a pattern of variation in said property with time which is consistent with a watermark pattern.

Another aspect of the invention provides a method of watermarking a video signal, the video signal comprising video content having a plurality of different spatial frequency components, the method comprising processing the video signal to produce a processed video signal having modified video content, said processing comprising modifying a magnitude of at least one selected non-dc spatial frequency component in a manner which varies with time according to a watermarking pattern.

In other words, the method comprises processing the video signal to produce a processed video signal having modified video content in which a magnitude of at least one selected non-dc spatial frequency component varies with time according to a watermarking pattern.

By non-dc, it is meant that the selected spatial frequency component is not a component corresponding to an average luminance value or chrominance value for a frame or sub-frame (e.g. block), or other such value that is uniform across a frame or sub-frame. The selected non-dc spatial frequency component may, for example, be a purely horizontal spatial frequency component, a purely vertical spatial frequency component, or a component comprising both non-zero horizontal and vertical spatial frequency components (and the number of horizontal and vertical spatial frequency components could be the same or different, depending on the particular embodiment). In this specification, the term horizontal frequency will be used to include both purely horizontal spatial frequency components and components comprising a larger number of horizontal frequency components than vertical frequency components. Similarly, the term vertical frequency will be used to include both purely vertical spatial frequency components and components comprising a larger number of vertical frequency components than horizontal frequency components. For example, with regard to the commonly used set of DCT basis functions, the horizontal frequencies are those components on the upper, right hand side of the diagonal, and the vertical frequencies are those on the lower, left hand side of the diagonal.

Advantages associated with watermarking in this way (by modulating one or more spatial frequencies according to the watermarking pattern) include the following: the watermark is related to the content (e.g. boosting/suppressing some of its frequencies), so it can easily be visually imperceptible; the watermark may be "constant" over the whole frame (or group of frames), therefore changes on frame geometry have limited impact (small rotations, re-sizing and cropping may not affect the watermark) and as a result, the method is robust against camcorder capture; and the method can be implemented very efficiently in base-band and compressed video signals (as described below).

In certain embodiments, said modifying comprises alternately increasing and decreasing said magnitude. In other words, the processing may comprise alternately boosting (enhancing, emphasizing) and suppressing (reducing, de-emphasizing) the selected spatial frequency component(s) according to the watermarking pattern.

The processing may comprise modifying the magnitude of at least one selected horizontal spatial frequency component in a manner which varies with time according to the watermarking pattern and modifying a magnitude of at least one selected vertical spatial frequency component in a manner which varies with time according to the watermarking pattern. For example, according to the watermarking pattern, the processing may alternately enhance each selected horizontal frequency while suppressing each selected vertical frequency, and then suppress the horizontal(s) while enhancing the vertical(s).

Although in certain embodiments just one horizontal and one vertical frequency are modified to embed the watermark, in alternative embodiments a plurality of horizontal and vertical frequencies may be used. In particular embodiments, all of the horizontal and vertical frequencies are used, with the watermark being embedded by alternately enhancing the horizontal frequencies while suppressing the vertical frequencies, and then suppressing the horizontals while enhancing the verticals.

In certain embodiments said processing comprises filtering the video signal, which may, for example, be a baseband signal. One or more filters may be used. For example, two linear filters may be used, one directed towards horizontal frequencies and the other towards vertical frequencies. Another alternative is to use a two dimensional filter (i.e. one which affects both horizontal and vertical frequencies when applied to the video signal).

In certain embodiments the video signal comprises a plurality of DCT coefficients and the processing comprises modifying a magnitude of at least one selected DCT coefficient in a manner which varies with time according to a watermarking pattern. The selected DCT coefficient will, of course, correspond to a non-dc component of spatial frequency. This method may be carried out as part of an encoding process. For example, one may start with a baseband signal and then perform a DCT operation to encode each block as a matrix of DCT coefficients. Then, the watermarking method modifies the magnitude of one or more of the DCT coefficients in time in accordance with the watermarking pattern. After this modification, the encoding process may than comprise a quantizing step, after which the watermarking pattern may be indelibly imprinted on the signal.

In certain embodiments the video signal comprises a plurality of DCT coefficients and the processing comprises: quantizing the DCT coefficients using a quantization matrix comprising a plurality of quantization factors; and modifying a magnitude of at least one selected quantization factor in a manner which varies with time according to the watermarking pattern. Again, the selected quantization factor(s) will correspond to a non-dc component of spatial frequency.

In certain embodiments the video signal is in an encoded format comprising a sequence of frames and sequence headers, each sequence header comprising a quantization matrix comprising a plurality of quantization factors, and said processing comprises modifying a magnitude of at least one selected quantization factor in a manner which varies with time according to the watermarking pattern.

Thus, the watermarking method may operate on a signal in the compressed domain, and may simply operate on the quantization matrices in the sequence headers, leaving the frames between the headers unchanged. The effect is still to modify the video content, because when a baseband signal is derived (reconstructed, decoded) from the watermarked processed signal, at least one non-dc spatial frequency component will display a time-variation in accordance with the watermark pattern as a result of the modification to the sequence headers.

In certain embodiments the video signal is in an encoded format comprising content transformed into a plurality of sub-bands, each sub-band corresponding to a respective frequency range, and a plurality of headers each containing a plurality of quantization step sizes to be used in de-quantizing the transformed content of the respective sub-bands, and said processing comprises modifying a magnitude of at least one selected step size in a manner which varies with time according to the watermarking pattern. Again, the watermarking method can thus operate on a signal in the compressed domain; just the quantization step sizes in the headers of the encoded signal may be modified to achieve the desired modulation of one or more spatial frequencies in video content. Equally, in alternative embodiments the watermarking method could be used during the encoding process, with the quantization step sizes being modified in accordance with the temporal watermark pattern as the quantized sub-band coefficients are generated.

Another aspect of the invention provides a method of detecting a watermark in a video signal, the watermark having been embedded in the signal using a method comprising processing a source video signal comprising video content having a plurality of different spatial frequency components to produce said video signal having modified video content, said processing comprising modifying a magnitude of at least one selected non-dc spatial frequency component in a manner which varies with time according to a watermarking pattern, the detection method comprising:

monitoring a property of the video signal that is indicative of a variation with time in the magnitude of at least one non-dc spatial frequency component; and identifying a pattern of variation in said property with time which is consistent with a watermark pattern.

Yet another aspect provides a device comprising a processor adapted to process a video signal to watermark the video signal in accordance with a method described above.

A further aspect provides a device adapted to perform a detection method as described above, the device comprising property monitoring means and pattern identification means.

These and other aspects of the invention, and further features of embodiments of the invention and their associated advantages, will be apparent from the following description of embodiments and from the claims.

BRIEF DESCRIPTION OF THE DRAWINGS

Embodiments of the invention will now be described, by way of example only, with reference to the accompanying drawings, of which.

DESCRIPTION OF EMBODIMENTS

As described above, it may be impractical or impossible to modify existing consumer devices such as PVRs to include additional hardware dedicated to watermarking. Placing such dedicated hardware into the consumer device could be done for the next generation devices, but this would of course add complexity and cost. The inventors of the present invention have appreciated that, in contrast, it is relatively easy to update the software in many existing devices. However, to be used for watermarking video signals the existing processor should be able to handle the overhead introduced by the watermarking software. In general, previous watermarking algorithms have required significant processing resources and thus have not been suitable for existing resource-constrained consumer devices. Having observed the problem associated with existing algorithms, the present inventors have developed a watermarking procedure that can be implemented in existing devices with negligible overhead. In particular embodiments of the invention the watermarking method utilizes the available resources in the consumer device and modifies the behavior of existing modules to embed a forensic tracking watermark. Application of the invention to existing consumer devices is therefore limited to those devices that have the necessary modules (in particular a video encoder) with desired properties (e.g. flexible encoding parameters).

A first embodiment of the invention uses quantization matrix modulation to embed a watermark during MPEG encoding of a video signal, as follows.

MPEG-1, MPEG-2 and MPEG-4 (Part 2) video compression standards are well known and are based on a 8×8 block DCT transforms of corresponding pixel data blocks, and subsequent quantization of each of these coefficients (of the DCT matrices) using the corresponding entry (quantization factor) in an 8×8 "quantization matrix". Table I, below at the end of the description, is an example of one such quantization matrix used to quantize the DCT coefficients of intra blocks (e.g. blocks belonging to I frames of an MPEG signal). In general, quantization levels (i.e. the values of the quantization factors) are higher for high frequency coefficients, i.e. a coarser quantization is applied. This is due to the relatively low sensitivity of the human visual system to high frequency quantization errors. In addition to a default quantization matrix such as that shown in Table I, the above standards allow the encoder to specify a custom matrix in the bit-stream. Moreover, this matrix can be altered within the bit-stream to accommodate changes in content characteristics, for example to maintain a generally constant bit rate. For instance, MPEG-2 streams are modified either by repeating the sequence_header( ) with a different intra_quantizer_matrix entry or by using the quant_matrix_extension( ).

Figure 1:
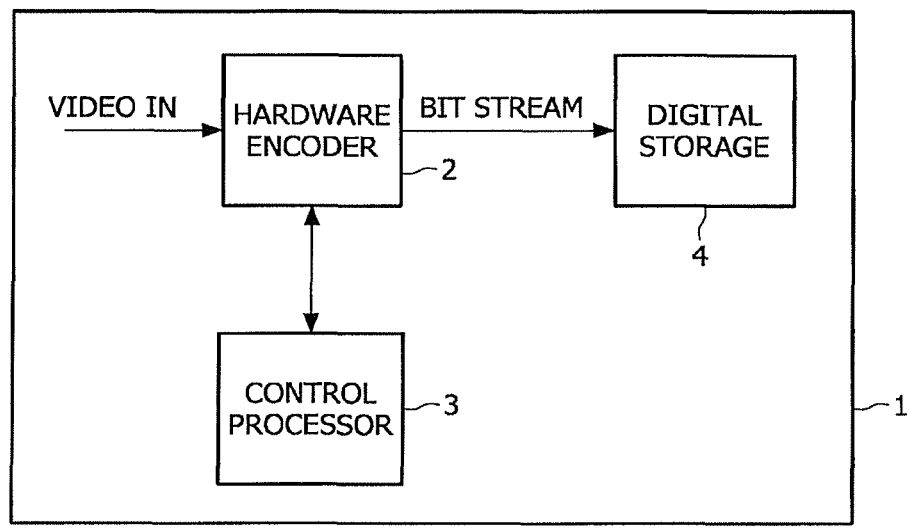
FIG. 1 is a schematic representation of a PVR embodying the invention and in which a general purpose processor controls the functions of a hardware MPEG encoder.

The first embodiment is a consumer device that encodes content according to one of these standards. This first embodiment is a PVR 1 adapted to encode an analog video signal input before recording, and is represented as a block diagram in FIG. 1. The device 1 comprises a controller 3 (in the form of a controller chip or processor), a dedicated MPEG encoder (hardware encoder 2), and digital storage means 4. The encoder is flexible and in particular allows for initialization and on-the-fly update of custom quantization matrices. The controller 3 in this example is adapted to receive a digital watermarking pattern (which may also be described as a watermarking code) from an external source, such as the video signal broadcaster, and then controls the encoder 2 such that at least one of the encoder parameters used to encode the video input signal is varied in time according to that watermarking pattern. The pattern may be pseudo-random. It will be appreciated that in other embodiments, however, the controller may be adapted to generate a watermarking pattern, rather than relying on being programmed with one. In this example the encoder parameters varied to embed the watermark pattern are two of the quantization matrix factors. Thus, the PVR 1 of FIG. 1, which itself is an embodiment of the invention, is arranged to implement a watermarking method embodying the invention. In this method the encoder is forced (by the controller 3) to use a series of different quantization matrices in time to encode the video signal, that series or sequence being determined by the watermarking pattern.

Consider a watermarking pattern in the form of a binary number 01011010. The method embeds this pattern in the encoded signal as follows. To embed a zero, rather than using the default quantization matrix of table I, the controller 3 controls the encoder to use the modified quantization matrix shown in table II. In this modified matrix, the value of the quantization factor in the fifth column of the first row has been increased compared with its default value (from 26 to 64) and at the same time the value of the quantization factor in the fifth row of the first column has been decreased (from 22 to 16). To embed a one of the watermark code, rather than using the default quantization matrix of table I, the controller 3 controls the encoder to use the modified quantization matrix shown in table III. In this modified matrix, the value of the quantization factor in the fifth column of the first row has been decreased compared with its default value (from 26 to 16) and at the same time the value of the quantization factor in the fifth row of the first column has been increased (from 22 to 64). The controller 3 determines the timing of the application of the different quantization matrices to the encoder 2 in accordance with the watermark code. In certain embodiments, for example, each bit of the watermark code may be embedded by applying the relevant matrix to the encoding of just a single block, with the next matrix of the sequence then being used for the next block. Alternatively, each bit may be embedded by applying the relevant matrix to the encoding of a longer portion of the video signal, for example a plurality of blocks, a complete frame, a number of frames, a group of pictures, or an even longer portion. The inventive method in its broadest sense is, however, not limited to any particular time interval.

In one embodiment of the invention, the watermark code 01011010 (which is simply just one example) is embedded in a sequence of eight GOPs, each GOP having been encoded using a respective one of the quantization matrices shown in tables II and III.

The effects of varying the quantization factors on the encoded signal are as follows. Using a coarser quantization (increased quantization level, i.e. increased value of the quantization factor) forces more coefficients to zero for that particular frequency, therefore the signal energy for that frequency will be reduced in the reconstructed frame. Similarly, a finer quantization (lower quantization level) will have the opposite effect of higher signal energy. This is assuming a well-behaved probability distribution of the coefficients prior to quantization (e.g. typically a symmetric and monotonically decreasing function). In certain embodiments of the invention these modifications are performed consistently according to a pattern (the watermarking pattern) that changes pseudo-randomly in time, and they form an invisible imprint on the video. This imprint can later be detected by accumulating the energy of that particular frequency band and correlating its variation in time to the reference watermark pattern.

Figure 2:
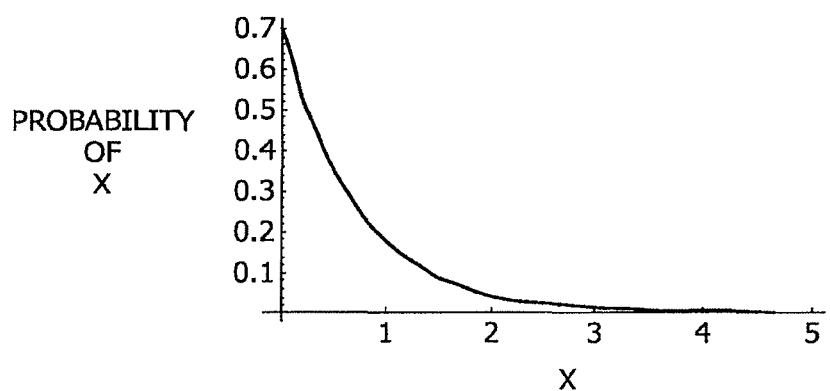
FIG. 2 is a plot of Laplacian distribution of unit variance.

The DCT coefficients obtained during compression of visual data are best described by a Laplacian distribution. A Laplacian distribution of unit variance is seen in FIG. 2 (only positive side is shown). Let x denote the random variable taken from a Laplacian distribution. (In general, actual DCT coefficients of a video signal will be statistically similar to x. Therefore, we can investigate the statistical properties of x and its quantization to gain insights to the statistical behaviour of DCT coefficients.

Figure 3:
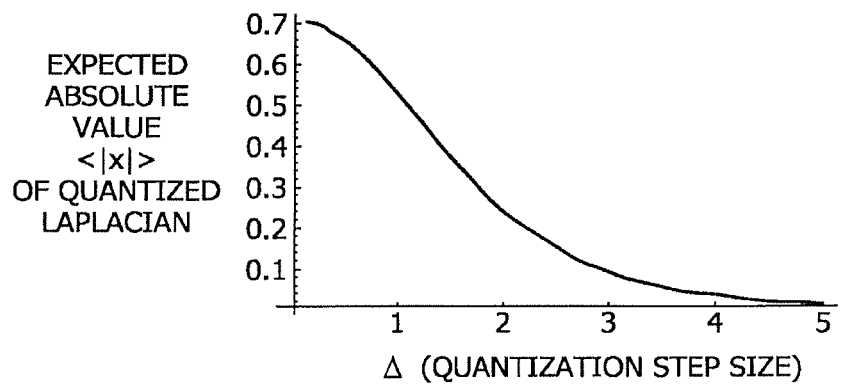
FIG. 3 is a plot of the expected absolute value $<|x|>$ as a function of quantization step size $\Delta$, where the quantization is $2\Delta |x/(2\Delta)+0.5|$.

During compression the DCT coefficients are quantized by a scalar quantizer. We denote this quantization by 2delta $[(x/2delta)+0.5]$, where the quantization step size (quantization factor) is delta. The expected absolute value $<|x|>$ of the resulting quantized signal (thus the DCT coefficients) will be a function of the quantization step size. This relation is shown in FIG. 3. Larger quantization values will lead to smaller expected (sum of) absolute values. We, therefore, conclude that on average the higher quantization step size will result in lower absolute values for reconstructed (decompressed) DCT coefficients.

A watermark detection method embodying the invention will now be described. This method is suitable for detecting watermarks embedded using the technique described above which used the modified quantization matrices of tables II and III. Watermark detection is performed by taking the following steps:

Compute 8×8 block DCTs for the luminance channel of the source signal. (If the source signal is a baseband signal then the method should also comprise the step of computing the luminance channel before performing DCT).

(Similarly, if the source signal is MPEG compressed, then the method should also comprise inverse entropy coding and inverse quantization to arrive at the DCT matrices).

DCT coefficients are $C^k_{i,j}$ where k is the block number and $0 \le i < 8$, $0 \le j < 8$ are respectively row and column indices and indicate the position of the coefficient.

Accumulate the absolute value of each coefficient for all blocks (over the relevant time interval). $C^-_{i,j} = \Sigma_k |C_{i,j}|$ Compute the difference $\Delta = C^-_{0,4} - C^-_{4,0}$ Detect the bit: b=0 if $\Delta < 0$, b=1 if $\Delta \ge 0$ If necessary, the sequence of detected bits can then be correlated with a known watermark to look for a correlation.

From the above description it will be apparent that embodiments of the invention provide a number of advantages. These include:

The watermarking technique may have minimal overhead (in terms of processing resources needed to implement it), provided that the hardware encoder is flexible enough to accommodate the modified use.

Complexity is with the encoder; so higher bit-rates high definition video does not affect complexity. For instance, if the encoder is capable of encoding standard-definition and high-definition video, the latter being much more computationally complex. The overhead of embedding a watermark is the same, e.g. the quantization matrix needs to be changed for every GOP.

Detection can be performed in baseband or in compressed domain (with similar codecs).

The watermark may survive decompression and re-compression.

It will be appreciated that in certain cases where a method embodying the invention has been used to embed a watermark in an MPEG encoded signal, it may be possible to inspect the header information in the signal (e.g. to see the quantization matrices) to learn about the watermark. The amount of information easily accessible by such inspection depends on the magnitude/position of the modifications to the relevant parameter values. Smaller modifications at different locations (within the matrix) will be harder to inspect, and indeed such techniques are used in certain embodiments of the invention. However, watermarks embedded in this way require accumulation of more statistics for detection, as well.

From the introduction above it will be appreciated that owing to the high data rates involved (over 100 Mb/s for standard definition TV), video watermarking in the past has often required either dedicated hardware or significant processor resources. This requirement has inhibited the introduction of video watermarking in existing low-cost consumer devices such as PVRs (personal video recorders). These devices often have a slow general purpose processor and dedicated video encoder/decoder chips.

Certain embodiments of the invention provide a low complexity video watermarking technique that can be applied on readily available resources with minimum overhead. Certain embodiments of the invention are particularly useful for implementing forensic tracking watermarks in current generation PVRs.

Certain techniques embodying the invention rely on the programmability of the dedicated video encoder chips. A small piece of software runs on the general-purpose processor that controls the encoder chip. It updates the encoding parameters, in particular the MPEG quantization matrix, in time according to a predefined (or pseudo-randomly generated) pattern. This pattern—or its imprint on the encoded video—constitutes the watermark. A detection mechanism is also provided.

Another aspect of the invention can be regarded as video watermarking by temporal modulation of spatial frequencies. This aspect is generally characterized as a method of watermarking a video signal, the video signal comprising video content having a plurality of different spatial frequency components, the method comprising processing the video signal to produce a processed video signal having modified video content, said processing comprising modifying a magnitude of at least one selected non-dc spatial frequency component in a manner which varies with time according to a watermarking pattern. Advantages and embodiments will now be described.

The method may be used for video watermarking for forensic tracking in internet-protocol-television (IP-TV) and video-on-demand (VoD) applications; these are important emerging markets. The method may be performed using new algorithms that are suitable for hardware/software implementations on set-top-boxes (STB).

Certain embodiments provide a watermark embedding method that changes (modulates) the spatial-frequency characteristics of video content in time. Particular methods emphasize/de-emphasize horizontal/vertical spatial frequencies in each group of frames according to a pre-defined watermark pattern, which represents payload information. For instance, in order to embed a +1, the method may boost horizontal frequencies and suppress vertical frequencies; in order to embed a −1, the method may boost vertical frequencies and suppress horizontal frequencies. A watermark detection method embodying the invention may then compute the relative strength (magnitude) of horizontal and vertical frequencies. If horizontal frequency strength is higher (resp. lower) than the vertical frequency strength, the method may output a value of +1 (resp −1). Multiple such values form a sequence which is correlated with the pre-defined watermark pattern to decide on the presence of the watermark.

In one example of a watermarking method embodying the invention, we first obtain a pseudo-random watermark pattern w with elements taken from a bimodal distribution, i.e. $w[k] \in \{-1, +1\}$. For each element w[k], we mod the spatial-frequency characteristics of a corresponding frame (or group of frames). For instance, if w[k]=+1 then we boost horizontal frequencies and suppress vertical frequencies; if w[k]=−1 then we boost vertical frequencies and suppress horizontal frequencies. These boost and suppress modifications can be performed in a number of ways as explained in the embodiments and examples below.

In order to detect the watermark embedded using the method described above, we compute the relative strength (magnitude/energy) of horizontal and vertical frequencies for each frame (or group of frames). If the horizontal frequency strength is higher than the vertical frequency strength, we set the corresponding element of the derived vector y to a +1, i.e. y[k]=+1. Otherwise, we set y[k]=−1. The derived vector y is correlated with w to decide the presence/absence of the watermark. In the absence of a watermark, we expect the horizontal and vertical frequencies to be statistically identical. In that case, the derived vector will not be correlated with the watermark pattern. When the watermark is present, however, the derived vector will be correlated.

Advantages associated with watermarking in this way (by modulating one or more spatial frequencies according to the watermarking pattern) include the following:

The watermark is related to the content (boosting/suppressing some of its frequencies), so it can easily be visually imperceptible.

The watermark is "constant" over the whole frame (or group of frames), therefore changes on frame geometry has limited impact. Small rotations, re-sizing and cropping do not affect the watermark.

As a result, the method is robust against camcorder capture.

The scheme (method) can be implemented very efficiently in base-band and compressed video signals (as described below).

In certain embodiments the watermark symbols w[k] may be taken from any distribution, e.g. Gaussian. Then the boosting/suppression can be arranged to be proportional to the watermark value. For instance, the method may boost/suppress more if w[k]=2.

Similarly, boost/suppress operations may be scaled by a strength factor α that is perceptually relevant and could be different for the different horizontal and vertical frequencies.

In certain embodiments the watermark may affect only one of the horizontal or vertical frequencies. For instance, we may only boost/suppress horizontal frequencies. There will still be a detectable imbalance between horizontal and vertical frequency magnitudes. The reason is human perception may be more sensitive to one direction for a certain class of content.

In certain embodiments the watermarking method may be performed as suppress operations only, to prevent underflows and overflows. The suppress operation decreases the magnitude of a particular frequency. Therefore, it is likely to reduce the range of corresponding signal (e.g. pixel) values. On the contrary, the boost operation increases (i.e. amplifies) a particular frequency and potentially increases the range of the corresponding signal values. This increase may introduce underflows (when the sine wave is negative) or overflows (when the sine wave is positive). Even when underflow and overflow conditions saturate (e.g. saturate at 255 and do not wrap around from 255 to 0), they may still cause artifacts. A suppress only watermark is less likely to cause such artifacts.

Different watermark embedding mechanisms (i.e. methods of processing video signals to watermark them) will now be described.

One embedding (processing) method comprises filtering, and in particular linear filtering. The method uses two filters that are geared toward horizontal or vertical frequencies: $H_{horz}$, $H_{vert}$ with unity gain.

Given the watermark symbol w[k], we compute the watermarked frame $f_{wm}$ as:

$$f_{wm} = f_{orig} + \alpha_1 \omega[k](H_{horz} * f_{orig}) - \alpha_2 \omega[k](H_{vert} * f_{orig}) \quad (1)$$

where * is the convolution operation performed on rows (horizontal) or columns (vertical) of a frame and $\alpha_1$, $\alpha_2$ are optional watermark strength parameters. Similarly, in alternative embodiments, two dimensional filter kernels may be used.

Another method operates on block DCTs. Each frame $f_{orig}$ may be divided into blocks f(m,n) of a pre-determined size, e.g. 8×8. (m,n is the block number.)

Figure 4:
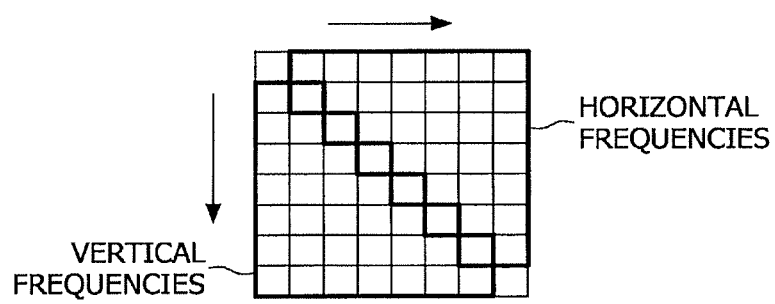
FIG. 4 is a representation of an 8×8 block of DCT coefficients (i,j) of a video signal which may be watermarked using methods and apparatus embodying the invention.

Each block is DCT transformed, i.e. F(m,n, i,j)=DCT (f(m,n)) (i,j) are frequency coefficient indexes). One or more DCT coefficients corresponding to a horizontal or vertical frequency are increased/decreased by a multiplicative watermark value. The horizontal and vertical frequencies are shown in FIG. 4.

In this context, we define a horizontal frequency as i<j (upper-right triangle) and vertical frequency as i>j (lower-left triangle).

$$F_{wm}(m, n, i, j) = \begin{cases} F(m, n, i, j)(1 + \alpha_1 w[k]) & \text{if } i < j \\ F(m, n, i, j)(1 - \alpha_2 w[k]) & \text{if } i > j \\ F(m, .n, i, j) & \text{if } i = j \end{cases} \quad (2)$$

for all m,n and selected i,j, where $\alpha$ is an optional watermark strength parameter.

Certain processing methods utilized in embodiments of the invention can be described under the heading of compressed domain embedding. One such technique involves modifying quantization matrices, as follows. In certain applications the forensic tracking watermark has to be embedded into the video by modifying the compressed bit-streams, because decompressing the bit-stream, embedding the watermark and re-compressing into a bit-stream can be computationally prohibitive. A typical elementary video stream for MPEG-2 contains sequence headers at regular intervals. In many cases, one sequence header is present for every half a second (or so) of video information to enable decoders to join in (e.g. channel switching on a TV set or fast-forward in a player). One field in the sequence header is the quantization matrix. This matrix multiplies the quantized DCT coefficients encoded in the bit-stream for the de-quantization step of decoding process. That is:

$$F(m,n,i,j) = F_{quant}(m,n,i,j)Q(i,j) \quad (3)$$

where $F_{quant}(m,n, i,j)$ are quantized DCT coefficient values encoded in the bit-stream, Q(i,j) is the quantization matrix specified in the sequence header, and F(m,n, i,j) are reconstructed DCT values.

In the present compressed domain implementation, we assume the same watermark symbol is embedded into the group of frames that utilize the same quantization matrix from a sequence header. Therefore, the watermarking method modifies the quantization matrix in each sequence header according to the corresponding watermark value w[k] to embed the watermark into the bit-stream (MPEG syntax allows for a default quantization matrix to be flagged using a single bit in the bit-stream. If this is the case, we reset that bit and insert the modified quantization matrix).

There are several modification possibilities, e.g.:

$$Q_{wm}(i, j) = \begin{cases} Q(i, j) + \alpha_1 w[k] & \text{if } i < j \\ Q(i, j) - \alpha_2 w[k] & \text{if } i > j \\ Q(i, j) & \text{if } i = j \end{cases} \quad (4)$$

$$Q_{wm}(i, j) = \begin{cases} Q(i, j)(1 + \alpha_1 w[k]) & \text{if } i < j \\ Q(i, j)(1 - \alpha_2 w[k]) & \text{if } i > j \\ Q(i, j) & \text{if } i = j \end{cases} \quad (5)$$

for selected i,j (as in the section above on DCT modification, we may have a negative modification for some coefficients) and where $\alpha$ is an optional watermark strength parameter. Note that we use either the first or the second modification method. The quantized DCT coefficients in the rest of the bit-stream are left unchanged.

The change in the quantization matrix of Eqn. 4 (for i<j) is reflected on the decompressed video frame as:

$$F_{wm}(m, n, i, j) = F_{quant}(m, n, i, j)Q_{wm}(i, j) \quad (6)$$

$$= F_{quant}(m, n, i, j)(Q(i, j) + \alpha w[k]) \quad (7)$$

$$= F(m, n, i, j) + \alpha w[k]F_{quant}(m, n, i, j) \quad (8)$$

The change in the quantization matrix of Eqn. 5 (for i<j) is reflected on the decompressed video frame as:

$$F_{wm}(m, n, i, j) = F_{quant}(m, n, i, j)Q_{wm}(i, j) \quad (9)$$

$$= F_{quant}(m, n, i, j)Q(i, j)(1 + \alpha w[k]) \quad (10)$$

$$= F(m, n, i, j)(1 + \alpha w[k]) \quad (11)$$

In short, this modification boosts (resp. suppresses) selected DCT coefficients of the video frame (or group of frames) when the corresponding quantization matrix element is increased (resp. decreased).

The scheme may be extended to MPEG-4 (Part 2) and MPEG-4 (Part 10 or H.264) in a similar manner. If individual frames are encoded using JPEG still image compression standard, the watermark symbol can still be realized in one or more frames by modifying the corresponding quantization matrices.

A use scenario for a Blu-Ray player is also envisaged. Recently, the new Blu-ray Disc standard has adopted "BD+" (a.k.a. SPDC) a virtual machine which runs code that comes with the movie on the disc; the VM was explicitly designed to allow the code to change the content in a device-specific way. Therefore, content owners could start to use the proposed watermarking methods described in this specification to forensically mark the output of BD-players (i.e. by modifying the quantization matrices). Similar functionality can be built into other new optical disc standards either through virtual machines or by standardizing the techniques proposed herein.

Figure 5:
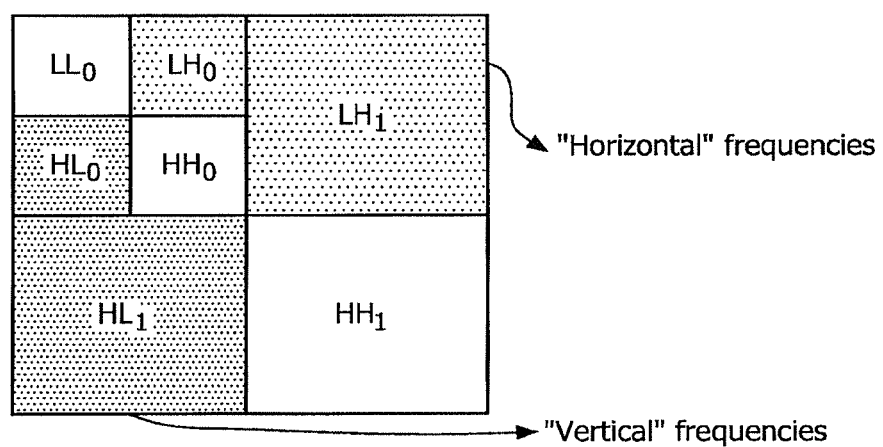
FIG. 5 is a representation of a 2 level wavelet decomposition of a video signal which may be watermarked using methods and apparatus embodying the invention.

A further watermarking technique can be described generally as modifying wavelet sub-band quantization step sizes. Video frames may also be encoded individually according to JPEG2000 standard as in certain digital cinema specifications. JPEG2000 transforms the video content into multiple sub-bands using a sub-band decomposition (wavelet) filter bank (see FIG. 5). Each sub-band corresponds to a certain frequency range. For instance, LL sub-band is obtained by low-pass filtering in both horizontal and vertical directions. Similarly, LH sub-band is obtained by low-pass filtering horizontal and high-pass filtering vertical frequencies. The LL sub-band may further be decomposed into its sub-bands at a second level. Coefficients in each sub-band b are quantized by quantizer step size $\Delta_b$. There is an option in the bit-stream syntax to transmit the step size for each sub-band within the headers of the bit-stream.

The sub-band quantization step size $\Delta_b$ is similar to the quantization matrix Q(i,j) of the JPEG/MPEG standards. They are used to de-quantize wavelet coefficients in a manner similar to Eqn. 3. Therefore, in certain embodiments of the invention we may embed a watermark by increasing/decreasing the quantizer step size $\Delta_b$ of selected sub-bands. For instance, we can increase it for the LH band to boost horizontal frequencies and decrease it for the HL band to suppress vertical frequencies.

$$\Delta_b^{wm} = \begin{cases} \Delta_b + \alpha_1 w[k] & \text{if } b = LH \\ \Delta_b - \alpha_2 w[k] & \text{if } b = HL \\ \Delta_b & \text{if } o/w \end{cases} \quad (12)$$

$$\Delta_b^{wm} = \begin{cases} \Delta_b(1 + \alpha_1 w[k]) & \text{if } b = LH \\ \Delta_b(1 - \alpha_2 w[k]) & \text{if } b = HL \\ \Delta_b & \text{if } o/w \end{cases} \quad (13)$$

Where $\alpha_1$ and $\alpha_2$ parameterize the embedding strength. Detection methods and detector devices embodying the invention will now be described.

Certain detection embodiments use filtering (hence certain detectors may be described as filtering detectors). In these embodiments the watermark may be detected by inspecting the strength (magnitude/energy) of horizontal and vertical spatial frequencies in each frame. In particular, using $H_{horz}$ and $H_{vert}$ we can estimate horizontal and vertical energies as:

$$E_{horz}[k] = \Sigma (H_{horz} * f_{suspect}[k])^2 \quad (14)$$

$$E_{vert}[k] = \Sigma (H_{vert} * f_{suspect}[k])^2 \quad (15)$$

or $$E_{horz}[k] = \Sigma |H_{horz} * f_{suspect}[k]| \quad (16)$$

$$E_{vert}[k] = \Sigma |H_{vert} * f_{suspect}[k]| \quad (17)$$

where the summation is over all pixels of a frame (or group of frames) and $f_{suspect}[k]$ is from the suspect video which is being probed for the presence of the watermark.

We further estimate the watermark symbol in that frame (or group of frames) by:

$$\tilde{W}[k] = \begin{cases} +1 & \text{if } E_{horz}[k] > E_{vert}[k] \\ -1 & \text{if } E_{horz}[k] < E_{vert}[k] \\ 0 & \text{if } E_{horz}[k] = E_{vert}[k] \end{cases} \quad (18)$$

or simply by one of $$\tilde{W}[k] = E_{horz}[k] - E_{vert}[k] \quad (19)$$

$$\tilde{W}[k] = \frac{E_{horz}[k] - E_{vert}[k]}{E_{horz}[k] + E_{vert}[k]} \quad (20)$$

After computing $\tilde{W}[k]$ for each frame (or group of frames) $f_{suspect}[k]$, we correlate the resulting sequence with the watermark pattern $w[k]$.

$$Corr = \sum_k \tilde{W}[k] w[k] \quad (21)$$

If Corr is above a threshold we declare that the video has this particular watermark pattern. Note that payload encoding (i.e. going from payload bits to the watermark symbols $w[k]$) and detection (i.e. going from frame information $f_{suspect}[k]$ to watermark symbol estimates $\tilde{W}[k]$ and eventually to payload bits) can be performed in many ways known to the person skilled in the field.

Certain other detectors may be described as DCT detectors. For example, if the watermark has been embedded by modifying quantization matrices as explained above, it may be detected by observing the statistics of block DCT coefficients. In particular detection embodiments we divide each frame into 8×8 blocks and perform a DCT transform to get $F(m,n,i,j)$, where m,n are the block indexes and i,j are coefficient indexes within the block. We further compute one of:

$$\overline{F}(i,j) = \sum_{m,n} |F(m,n,i,j)| \quad (22)$$

$$\hat{F}(i,j) = \sum_{m,n} (F(m,n,i,j))^2 \quad (23)$$

where |.| is the absolute value operator. This operation may also be performed for a group of frames where results of all frames in the group are added.

We may also compute the difference between horizontal and vertical frequencies as an estimate of the watermark symbol by:

$$\overline{W}(l) = \overline{F}(i,j) - \overline{F}(j,i) \quad (24)$$

$$\hat{W}(l) = \frac{\hat{F}(i,j) - \hat{F}(j,i)}{\hat{F}(i,j) + \hat{F}(j,i)} \quad (25)$$

for all i<j.

We therefore obtain a time-series for each coefficient pair difference. $\overline{W}(l,k)$ where l is the pair index and k is the time index.

Multiple detection strategies for detecting the watermarks may then be used in embodiments of the invention. For example, we may correlate each coefficient series with the watermark pattern.

$$Corr(l) = \sum_k \overline{W}[l,k] w[k]. \quad (26)$$

We may further take the coefficient with the maximum correlation, i.e. Corr=max Corr(l). We may also average the correlations (which are above a threshold), i.e. Corr=$\Sigma_l$ Corr (l).

Note that we do not necessarily require spatial synchronization between block boundaries. The scheme will work even when the block boundaries are shifted (e.g. due to cropping) by any amount (even if not a multiple of 8).

Detection of watermarks embedded in wavelet transformed signals is similar to that of the earlier examples described above. We use wavelet transform and select sub-bands instead of DCT coefficients.

Figure 6:
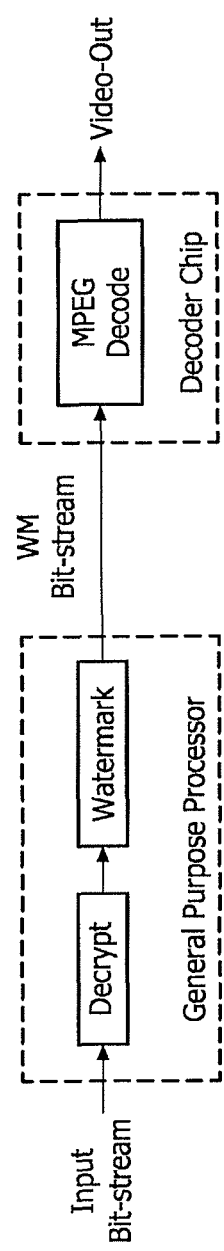
FIG. 6 is a block diagram of components of apparatus embodying the invention, with which an input bit-stream may be decrypted, watermarked, and decoded.

It will be appreciated that certain methods and apparatus embodying the invention can be used to watermark video signals that are in the compressed domain (i.e. they may involve compressed domain processing). Any method that directly works (acts) on compressed bit-streams with minimal complexity is advantageous, particularly in resource-constrained consumer devices such as set-top-boxes (STB). FIG. 6 shows an overview of the operations in a STB. The input bit-stream is decrypted and watermarked on [typically] a general purpose processor such as MIPS or ARM. The resulting watermarked bit-stream is either recorded on an optical disc or a hard disk drive (not shown), or decoded and output for display.

Figure 7:
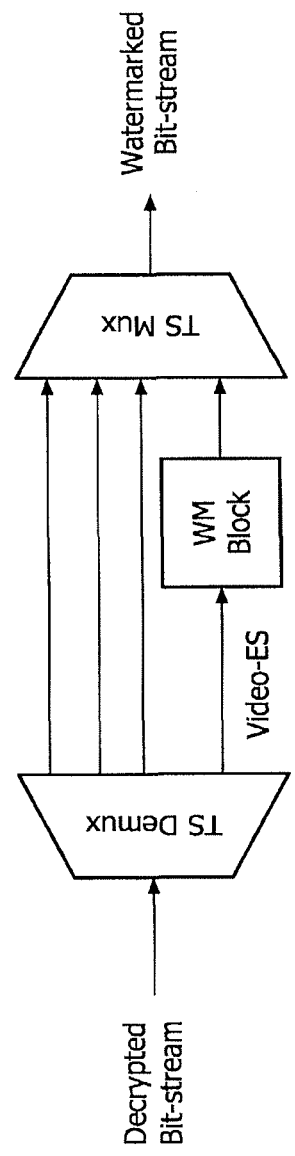
FIG. 7 is a block diagram of the de-multiplexing and re-multiplexing of an MPEG transport stream (TS) in certain embodiments of the invention.

The bit-stream watermarking module seen in FIG. 6 typically contains a demultiplexer front-end and a multiplexer back-end, such that it can process bit-streams where audio, video and possibly other information is interleaved. Demultiplexing of the transport stream is shown in FIG. 7.

It will be appreciated that throughout the present specification, including the claims, the words "comprising" and "comprises" are to be interpreted in the sense that they do not exclude other elements or steps. Also, it will be appreciated that "a" or "an" do not exclude a plurality, and that a single processor or other unit may fulfill the functions of several units, functional blocks or stages as recited in the description or claims. It will also be appreciated that reference signs in the claims shall not be construed as limiting the scope of the claims.

TABLE 1

MPEG-2 DEFAULT QUANTIZATION MATRIX FOR INTRA BLOCKS $$Qintra = \begin{vmatrix} 8 & 16 & 19 & 22 & 26 & 27 & 29 & 34 \\ 16 & 16 & 22 & 24 & 27 & 29 & 34 & 37 \\ 19 & 22 & 26 & 27 & 29 & 34 & 34 & 38 \\ 22 & 22 & 26 & 27 & 29 & 34 & 37 & 40 \\ 22 & 26 & 27 & 29 & 32 & 35 & 40 & 48 \\ 26 & 27 & 29 & 32 & 35 & 40 & 48 & 58 \\ 26 & 27 & 29 & 34 & 38 & 46 & 56 & 69 \\ 27 & 29 & 35 & 38 & 46 & 56 & 69 & 83 \end{vmatrix}$$

TABLE II

MODIFIED QUANTIZATION MATRIX FOR EMBEDDING BIT 0

$$Qintra^0 = \begin{vmatrix} 8 & 16 & 19 & 22 & \underline{64} & 27 & 29 & 34 \\ 16 & 16 & 22 & 24 & 27 & 29 & 34 & 37 \\ 19 & 22 & 26 & 27 & 29 & 34 & 34 & 38 \\ 22 & 22 & 26 & 27 & 29 & 34 & 37 & 40 \\ \underline{16} & 26 & 27 & 29 & 32 & 35 & 40 & 48 \\ 26 & 27 & 29 & 32 & 35 & 40 & 48 & 58 \\ 26 & 27 & 29 & 34 & 38 & 46 & 56 & 69 \\ 27 & 29 & 35 & 38 & 46 & 56 & 69 & 83 \end{vmatrix}$$

TABLE III

MODIFIED QUANTIZATION MATRIX FOR EMBEDDING BIT 1.

$$Q^1 intra = \begin{vmatrix} 8 & 16 & 19 & 22 & \underline{16} & 27 & 29 & 34 \\ 16 & 16 & 22 & 24 & 27 & 29 & 34 & 37 \\ 19 & 22 & 26 & 27 & 29 & 34 & 34 & 38 \\ 22 & 22 & 26 & 27 & 29 & 34 & 37 & 40 \\ \underline{64} & 26 & 27 & 29 & 32 & 35 & 40 & 48 \\ 26 & 27 & 29 & 32 & 35 & 40 & 48 & 58 \\ 26 & 27 & 29 & 34 & 38 & 46 & 56 & 69 \\ 27 & 29 & 35 & 38 & 46 & 56 & 69 & 83 \end{vmatrix}$$

The invention claimed is:

1. A method of watermarking a video signal, the method comprising:
    encoding the video signal using a plurality of encoding parameters; and
    during the encoding, varying a value of at least one of the parameters with time according to a watermarking pattern, the at least one parameter being a parameter that affects at least a type or an amount of information lost in encoding the signal,
    wherein the value of the at least one parameter is constant per frame or group of frames of the video signal, and
    wherein the step of varying comprises:
        determining a sequence of quantization matrices according to a watermark pattern, wherein the quantization matrices comprise the encoding parameters; and
        encoding the video signal using the sequence of quantization matrices,
        wherein the quantization matrices used to encode the video signal vary with time and the at least one parameter comprises two quantization factors comprising a first quantization factor corresponding to a coefficient of a horizontal frequency and a second quantization factor corresponding to a coefficient of a vertical frequency of a spatial frequency transform.

2. The method of claim 1, wherein the step of varying further comprises increasing a value of one of the two quantization factors and decreasing a value of the other selected quantization factor with time according to the watermarking pattern.

3. The method of claim 1, wherein each of the two quantization factors is an element of a quantization matrix corresponding to a particular coefficient in a block DCT transform.

4. The method of claim 1, wherein each of the two quantization factor corresponds to a particular sub-band in a wavelet transform.

5. The method of claim 1, wherein the step of varying further comprises switching between a plurality of different sets of quantization factors.

6. The method in accordance with claim 1 used to watermark a video signal in a device comprising an encoder, wherein the step of encoding comprises using the encoder to encode the video signal, and the step of varying further comprises controlling the encoder to vary a value of the at least one selected quantization factor with time according to the watermarking pattern.

7. A device for watermarking a video signal, the device comprising:
    an encoder arranged to encode a video signal using a plurality of encoding parameters; and
    control means arranged to control the encoder, the control means being further arranged to:
        vary a value of at least one the encoding parameters with time, while the encoder is encoding a video signal, according to a watermark pattern, wherein the at least one parameter is a parameter that affects at least a type or an amount of information lost in encoding the signal,
        determine a sequence of quantization matrices according to a watermark pattern, wherein the quantization matrices comprise the encoding parameters; and
        encode the video signal using the sequence of quantization matrices, wherein the quantization matrices used to encode the video signal varies with time, and that the at least one selected parameters comprises two quantization factors comprising a first quantization factor corresponding to a coefficient of a horizontal frequency and a second quantization factor corresponding to a coefficient of a vertical frequency of a spatial frequency transform.

8. The device of claim 7, wherein the control means is further arranged to increase a value of one of the two quantization factors and decrease a value of the other selected quantization factor with time according to the watermarking pattern.

9. A method of watermarking a compressed video signal, the method comprising:
   demultiplexing the compressed video signal;
   multiplexing the video signal using a plurality of encoding parameters; and
   during the multiplexing, modifying a value of at least a selected one of the parameters of the demultiplexed compressed video signal with time according to a watermarking pattern, the selected parameter being a parameter that affects at least a type or an amount of information lost in encoding the signal,
   wherein the value of the at least one parameter is constant per frame or group of frames of the video signal; and
   wherein the step of varying comprises:
      determining a sequence of quantization matrices according to a watermark pattern, wherein the quantization matrices comprise the encoding parameters; and
      encoding the video signal using the sequence of quantization matrices, wherein the quantization matrices used to encode the video signal varies with time, and
      wherein the at least one selected parameter comprises two quantization factors comprising a first quantization factor corresponding to a coefficient of a horizontal frequency and a second quantization factor corresponding to a coefficient of a vertical frequency of a spatial frequency transform.

10. The method of claim 9, wherein the step of modifying comprises increasing a value of one of the two selected quantization factors and decreasing a value of the other selected quantization factor with time according to the watermarking pattern.

11. A device for watermarking a compressed video signal, the device comprising:
   a demultiplexer for demultiplexing the compressed video signal;
   a multiplexer arranged to encode a video signal using a plurality of encoding parameters;
   control means arranged to:
      modify a value of at least one the encoding parameters of the demultiplexed compressed video signal with time, while the encoder is encoding a video signal, according to a watermark pattern, wherein the at least one parameter being a parameter that affects at least a type or an amount of information lost in encoding the signal,
      determine a sequence of quantication matrices according to a watermark pattern, wherein the quantization matrices comprise the encoding parameters; and
      encode the video signal using the sequence of quantization matrices, wherein the quantization matrices used to encode the video signal varies with time, and
      wherein the at least one selected parameters comprises two quantization factors comprising a first quantization factor corresponding to a particular coefficient of a horizontal frequency and a quantization factor corresponding to a particular coefficient of a vertical frequency of a spatial frequency transform, each of the two selected quantization factors having a value.

12. The device of claim 11, wherein the control means is arranged for increasing the value of one of the two selected quantization factors and decreasing the value of the other selected quantization factor with time according to the watermarking pattern.

* * * * *